US008322376B2

(12) United States Patent
Ho

(10) Patent No.: US 8,322,376 B2
(45) Date of Patent: Dec. 4, 2012

(54) SOLENOID VALVE

(75) Inventor: Thanh Ho, Brunswick, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 1169 days.

(21) Appl. No.: 12/135,664

(22) Filed: Jun. 9, 2008

(65) Prior Publication Data

US 2009/0302250 A1    Dec. 10, 2009

(51) Int. Cl.
*F16K 31/06* (2006.01)
(52) U.S. Cl. ........... 137/625.65; 137/625.68; 137/596.2; 137/596.17; 251/129.21; 251/129.22
(58) Field of Classification Search ............. 137/625.65, 137/625.26, 625.68, 596.1, 596.2; 303/3; 251/129.21, 129.22, 129.15
See application file for complete search history.

(56) References Cited

U.S. PATENT DOCUMENTS

| 4,538,129 | A | * | 8/1985 | Fisher ........................... 335/230 |
| 4,760,694 | A | * | 8/1988 | Gillon, Jr. .................... 60/200.1 |
| 4,821,770 | A |   | 4/1989 | Parrott et al. |
| 4,998,559 | A |   | 3/1991 | McAuliffe, Jr. |
| 5,038,826 | A | * | 8/1991 | Kabai et al. ............... 137/625.65 |
| 5,163,474 | A |   | 11/1992 | Rizk |
| 5,449,119 | A |   | 9/1995 | Maley |
| 5,735,582 | A | * | 4/1998 | Eith et al. .................... 303/119.2 |
| 5,979,503 | A |   | 11/1999 | Abboud et al. |
| 6,189,983 | B1 |   | 2/2001 | Volz et al. |
| 6,209,971 | B1 |   | 4/2001 | Ho et al. |
| 6,305,759 | B1 |   | 10/2001 | Ho et al. |
| 6,325,468 | B1 |   | 12/2001 | Ho et al. |
| 6,386,649 | B1 |   | 5/2002 | Ross |
| 6,588,856 | B2 |   | 7/2003 | Herbst et al. |
| 6,719,265 | B2 | * | 4/2004 | Kloda et al. .................... 251/76 |
| 7,036,788 | B1 |   | 5/2006 | Schneider et al. |
| 7,354,118 | B2 |   | 4/2008 | Herbst |
| 7,415,341 | B2 |   | 8/2008 | Goebels et al. |
| 2004/0035472 | A1 | * | 2/2004 | Teltscher et al. ......... 137/596.17 |
| 2009/0045671 | A1 |   | 2/2009 | Ho |

FOREIGN PATENT DOCUMENTS

| CN | 2497127 Y | 6/2002 |
| DE | 3134613 A1 | 3/1983 |
| FR | 2560956 A | 9/1985 |

OTHER PUBLICATIONS

Bendix Commercial Vehicle Systems, LLC., AntiLock Modulator Assembly, Bendix M-30 Service Data Sheet, SD-13-4830, Bendix Commercial Vehicle Systems LLC, Sep. 2004.
International Search Report for Int'l Appln. No. PCT/US2009/043559, mailed Aug. 31, 2009.
Written Opinion of the International Searching Authority for Int'l Appln. No. PCT/US2009/043559, mailed Aug. 31, 2009.

* cited by examiner

*Primary Examiner* — John K Fristoe, Jr.
*Assistant Examiner* — Marina Tietjen
(74) *Attorney, Agent, or Firm* — Calfee, Halter & Griswold LLP

(57) ABSTRACT

In one embodiment, a solenoid valve includes a supply port that fluidly communicates with a source of compressed air, a delivery port, a bore that selectively fluidly communicates with the supply and delivery ports, an armature in the bore, a pole piece in the bore, and a coil that is selectively energized with electrical power. The coil is around the armature and pole piece. The armature and pole piece selectively sealingly engage and move as an armature/pole piece single unit as a function of the electrical power in the coil. A position of the armature/pole piece within the bore controls fluid communication between the supply port and the delivery port.

28 Claims, 5 Drawing Sheets

SOLENOID VALVE

BACKGROUND

The present invention relates to electronically controlled pressure systems. It finds particular application in conjunction with solenoids used for controlling pressure in pneumatically operated vehicles systems and will be described with particular reference thereto. It will be appreciated, however, that the invention is also amenable to other applications.

Solenoids are commonly used in vehicle compressed air systems for controlling flow of the compressed air from a supply air reservoir to a vehicle sub-system (e.g., a braking system) operated by the compressed air. It is not uncommon that the vehicle sub-system achieves optimal operation when the pressure of the compressed air within the vehicle sub-system is within a target range. Therefore, a solenoid is typically used in conjunction with a separate pressure limiting valve to more precisely control the amount of compressed air supplied to the vehicle sub-system.

When the pressure in the vehicle system drops below a cut-in pressure, the solenoid supplies the compressed air from the supply air reservoir to the vehicle sub-system via the pressure limiting valve. Once the pressure within the vehicle sub-system reaches a cut-out pressure, the solenoid is, for example, deenergized to prevent additional compressed air from being supplied to the vehicle sub-system. Although the cut-out pressure is designed to ensure the pressure within the vehicle sub-system is within the target range, the actual pressure supplied to the vehicle sub-system by the solenoid may overshoot the target range. In this case, the pressure limiting valve acts to exhaust any excess pressure from the vehicle air sub-system until the pressure of the compressed air within the vehicle sub-system is within the target range.

The present invention provides a new and improved apparatus and method which addresses the above-referenced problems.

SUMMARY

In one embodiment, a solenoid valve includes a supply port that fluidly communicates with a source of compressed air, a delivery port, a bore that selectively fluidly communicates with the supply and delivery ports, an armature in the bore, a pole piece in the bore, and a coil that is selectively energized with electrical power. The coil is around the armature and pole piece. The armature and pole piece selectively sealingly engage and move as an armature/pole piece single unit as a function of the electrical power in the coil. A position of the armature/pole piece within the bore controls fluid communication between the supply port and the delivery port.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
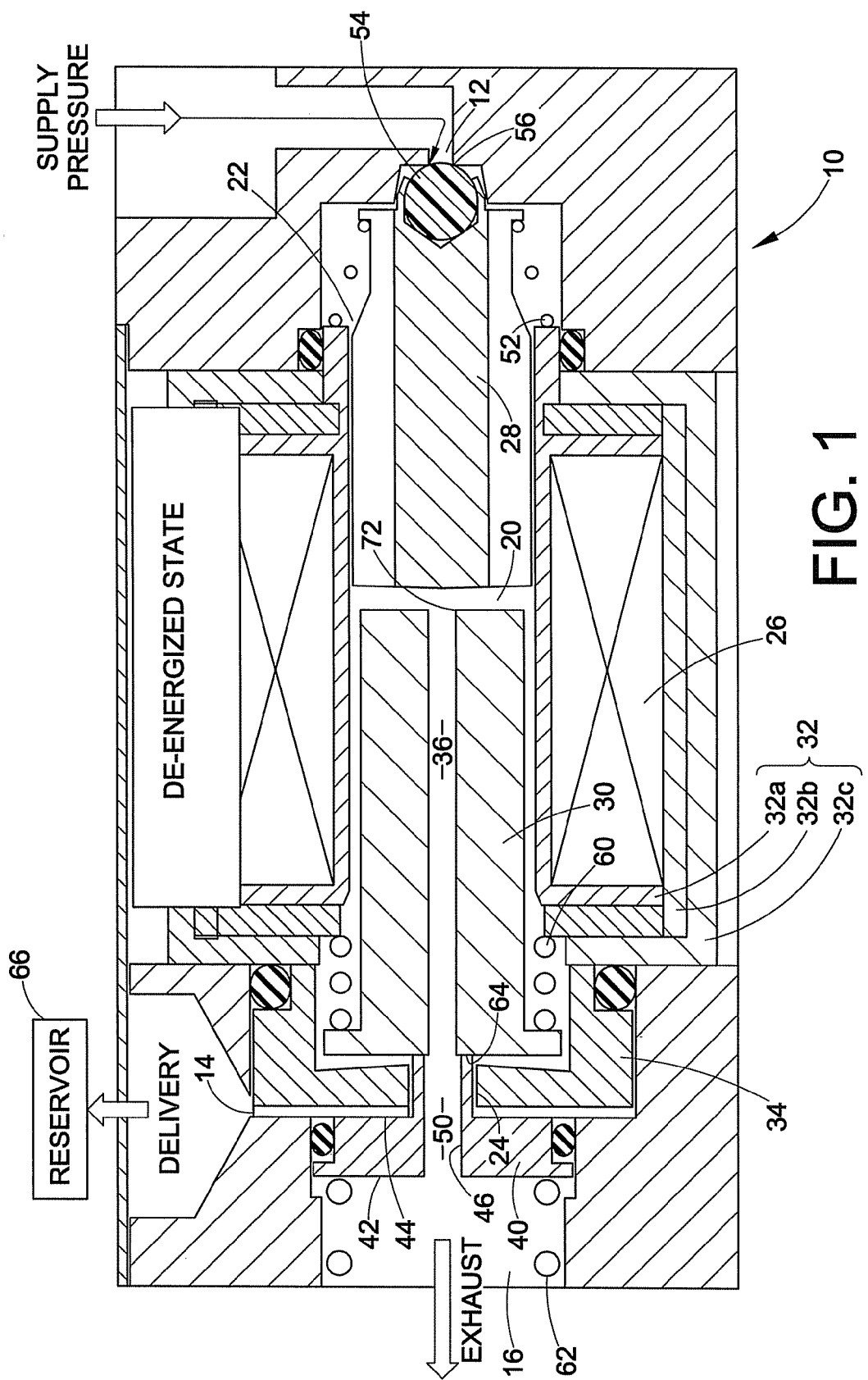
FIG. 1 illustrates a schematic representation of a solenoid valve in a de-energized state in accordance with one embodiment of an apparatus illustrating principles of the present invention.

With reference to FIG. 1, a solenoid valve 10 is illustrated in accordance with a first embodiment of the present invention. The solenoid valve 10 includes a supply port 12, a delivery port 14, and an exhaust port 16. A bore 20 is defined within the solenoid valve 10. A supply aperture 22, which fluidly communicates with the supply port 12, is at one end of the bore 20 and an exhaust aperture 24, which fluidly communicates with the exhaust port 16, is at a second end of the bore 20.

A solenoid coil 26 is positioned around a solenoid armature 28 and a solenoid pole piece 30. A coil housing 32 and an endcap 34 define the bore 20. In the illustrated embodiment, the coil housing 32 includes three (3) component pieces 32a, 32b, 32c. In addition, the coil housing 32 abuts the endcap 34 to form a bore housing 32, 34. The supply aperture 22 is defined at one end of the coil housing 32, and the exhaust aperture 24 is defined at one end of the endcap 34. The solenoid armature 28 passes through the supply aperture 22. The pole piece 30 includes a pole piece passage 36. A piston 40 passes through the exhaust aperture 24 of the endcap 34. The piston 40 includes a top face 42, a bottom face 44, and a stem portion 46. The stem portion 46 is positioned within the exhaust aperture 24 while the top and bottom faces 42, 44, respectively, are positioned outside of the endcap 34. A piston channel 50 fluidly communicates with the exhaust port 16.

FIG. 1 illustrates the solenoid valve 10 in a first state (e.g., a de-energized state) during which the coil 26 is not energized. In the first state, an armature spring 52 biases the armature 28 so that a seal 54 associated with the armature 28 sealingly engages a normally closed seat 56 associated with the supply port 12. A pole spring 60 and a piston spring 62 bias the pole piece 30 and the piston 40, respectively, toward each other. For example, the pole piece 30 is sealingly seated against a piston seat 64 on the stem portion 46 of the piston 40.

In the de-energized state illustrated in FIG. 1, the pole piece 30 is separated from the armature 28 thereby permitting fluid communication between the bore 20 and the exhaust port 16 via the pole piece passage 36 and the piston channel 50. In addition, since the seal 54 associated with the armature 28 sealingly engages the normally closed seat 56 associated with the supply port 12, no compressed air is fluidly communicated from the supply port 12 to either the delivery port 14 or the exhaust port 16. Therefore, a delivery reservoir 66, which fluidly communicates with the delivery port 14, fluidly communicates with atmospheric pressure via the pole piece passage 36 and the piston channel 50.

Figure 2:
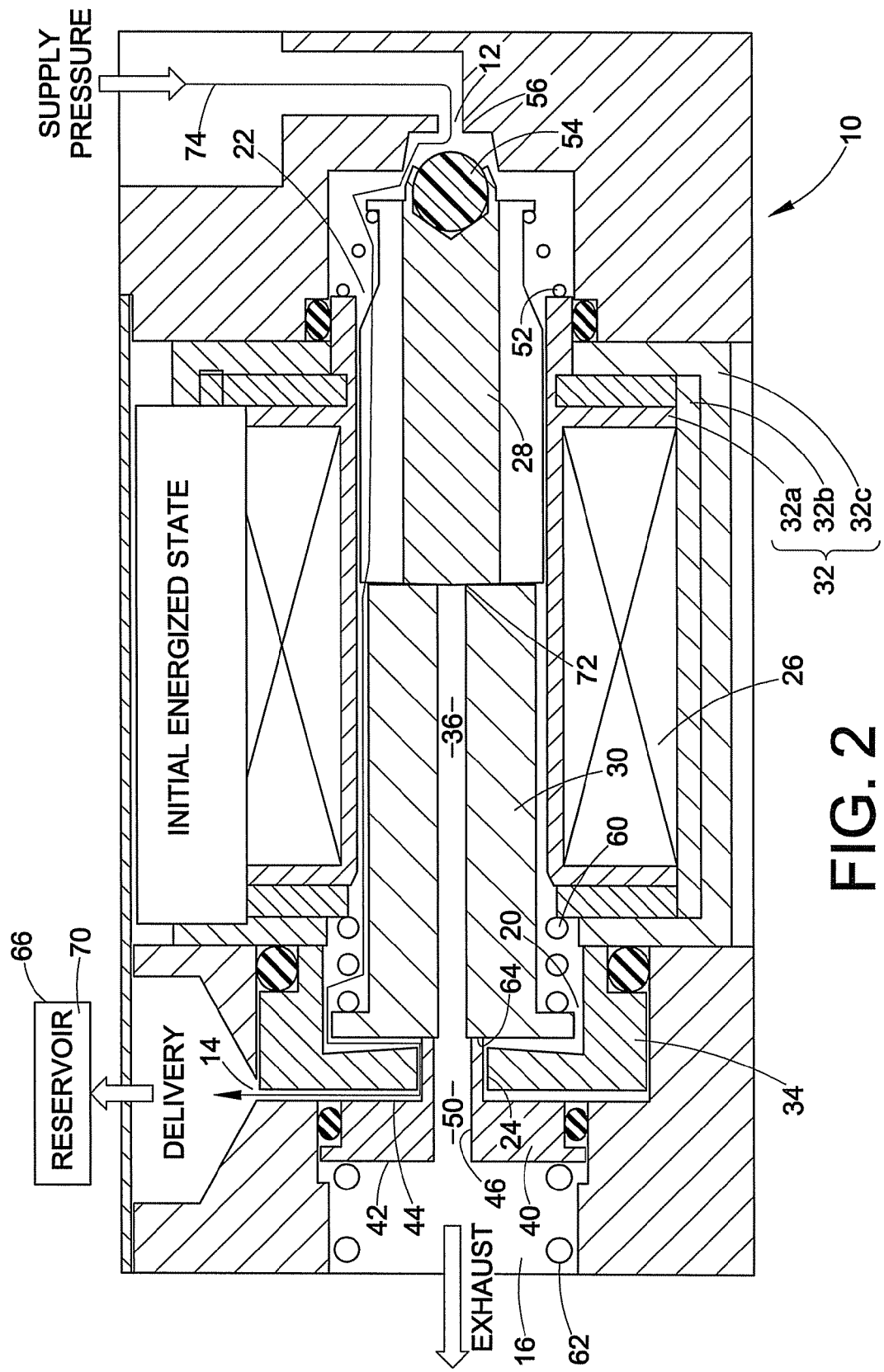
FIG. 2 illustrates a schematic representation of the solenoid valve in an initially energized state in accordance with one embodiment of an apparatus illustrating principles of the present invention.

With reference to FIG. 2, the solenoid valve 10 is illustrated during an initially energized state. In the first embodiment, it is contemplated that the coil 26 is energized when it is desired to maintain pressure in the delivery reservoir 66 between a target pressure range (e.g., between a cut-in pressure and a cut-out pressure). In this embodiment, once the coil 26 is energized, the pressure in the delivery reservoir 66 is regulated at least by respective tensions in the armature spring 52, the pole spring 60, and the piston spring 62 and the respective sizes (diameters) of the supply port 12 and the delivery port 14. In that regard, the spring tensions and port diameters are design parameters that may be adjusted to achieve different target pressure ranges in the delivery reservoir 66. In an alternate embodiment, the coil 26 is energized, for example, when a pressure in the delivery reservoir 66, as measured by a pressure sensor 70, drops below the target pressure range (e.g., drops below the cut-in pressure). In this alternate embodiment, the sensor 70 electrically communicates a signal to an electronic control unit (not shown), which energizes the coil 26 as a function of the pressure in the delivery reservoir 66. The electrical communication between the sensor 70, the ECU, and the coil 26 acts as an electrical feedback loop for maintaining pressure in the delivery reservoir 66 within the target pressure range. Therefore, in this alternate embodiment, the sensor 70 acts as a means for controlling a pressure in the delivery reservoir 66.

In the initially energized state, the electrical power passing through the coil 26 causes the armature 28 to move away from the supply port 12 and toward the pole piece 30. Both the armature 28 and the pole piece 30 include a metallic material causing the armature 28 and the pole piece 30 to be magnetically attracted to each other. After the coil 26 is energized, the magnetic attraction between the armature 28 and the pole piece 30 is increased so that the armature 28 and the pole piece 30 move together as a single unit. In addition, the magnetic attraction sealingly engages the armature 28 to a normally open seat 72 at an end of the pole piece passage 36. The energized coil 26 causes the single unit armature/pole piece 28, 30 to move away from the supply port 12 and maintain the seal between the piston seat 64 and the pole piece 30.

It is to be understood that in both the first and alternate embodiments, the coil 26, selectively energized with electrical power, the piston 40, and springs 52, 60, 62 act as a means for controlling the sealing cooperation between the armature 28 and the pole piece 30 and a state of delivering pressure to the delivery port 14. In addition, in the first embodiment, the armature 28 and springs 60, 62 act as a means for controlling a pressure in the delivery reservoir 66.

During the initially energized state illustrated in FIG. 2, the supply port 12 fluidly communicates with the delivery port 14. At the same time, neither the supply port 12 nor the delivery port 14 fluidly communicates with the exhaust port 16. A line 74 illustrates a path the compressed air flows between the supply port 12 and the delivery port 14. The line 74 illustrates that the compressed air enters the supply port 12, flows in the bore 20 between the coil housing 32 and the single unit armature/pole piece 28, 30, between the endcap 34 and the piston stem 46, and then between the endcap 34 and the bottom face 44 of the piston 40 before exiting the delivery port 14.

Figure 3:
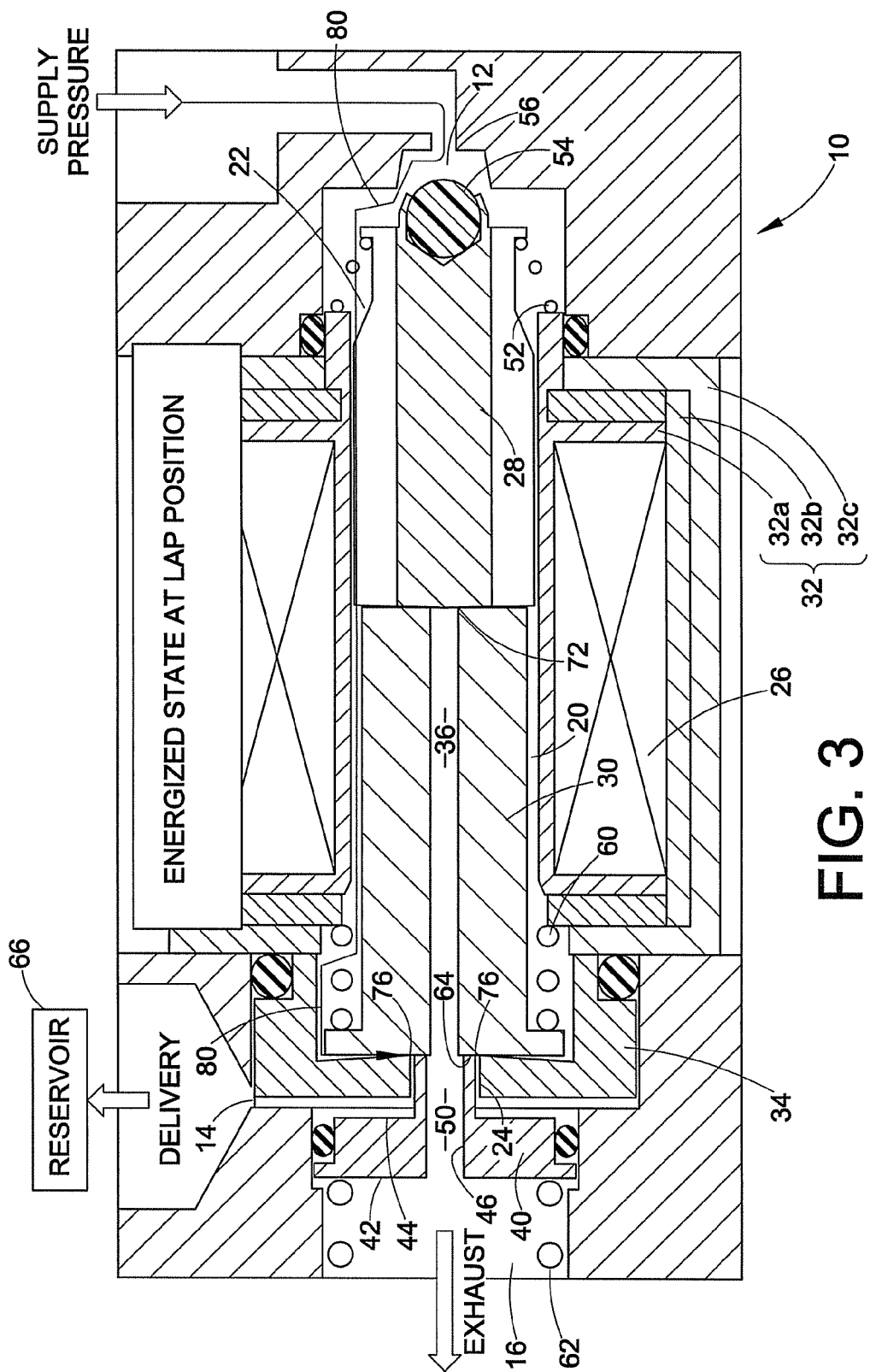
FIG. 3 illustrates a schematic representation of the solenoid valve in an energized state at lapped position in accordance with one embodiment of an apparatus illustrating principles of the present invention.

With reference to FIG. 3, the solenoid valve 10 is illustrated during an energized state at lapped position. In one embodiment, the energized state at lapped position occurs after the initially energized state (see FIG. 2). For example, compressed air is transmitted from the supply port 12 to the delivery port 14 during the initially energized state (see FIG. 2) until a pressure in the delivery reservoir 66 associated with the delivery port 14 exceeds the target pressure range (e.g., the pressure exceeds the cut-out pressure). Once the cut-out pressure is achieved in the reservoir 66, the solenoid valve 10 changes from the initially energized state (see FIG. 2) to the energized state at lapped position illustrated in FIG. 3.

In the energized state at lapped position, pressure at the delivery port 14 acts on the bottom face 44 of the piston 40 to move the piston 40 against the bias of the piston spring 62. Pressure on the bottom face 44 of the piston 40 moves the bottom face 44 away from the endcap 34 and toward the exhaust port 16. As the piston is moved away from the endcap 34, the bias of the pole piece spring 60 acts to overcome the bias of the armature spring 52 and moves the single unit armature/pole piece 28, 30 toward the exhaust aperture 24 of the to maintain the seal at the piston seat 64. As discussed above, the armature and pole piece 28, 30, respectively, move as a single unit and the normally open seat 72 of the pole piece 30 is sealed due to magnetic attraction.

As illustrated in FIG. 3, the pole piece 30 is sealingly seated against a delivery seat 76 of the endcap 34 portion of the bore housing 32, 34. In addition, the pole piece 30 is sealingly seated against the piston seat 64 on the stem portion 46. During the energized state at lapped position illustrated in FIG. 3, compressed air flows into the supply port 12 and into the bore 20. The seal at the delivery seat 76 of the bore housing 32, 34 prevents fluid communication between the bore 20 and the delivery port 14. Therefore, as illustrated by the line 80, the compressed air does not flow from the bore 20 to the delivery port 14.

Figure 4:
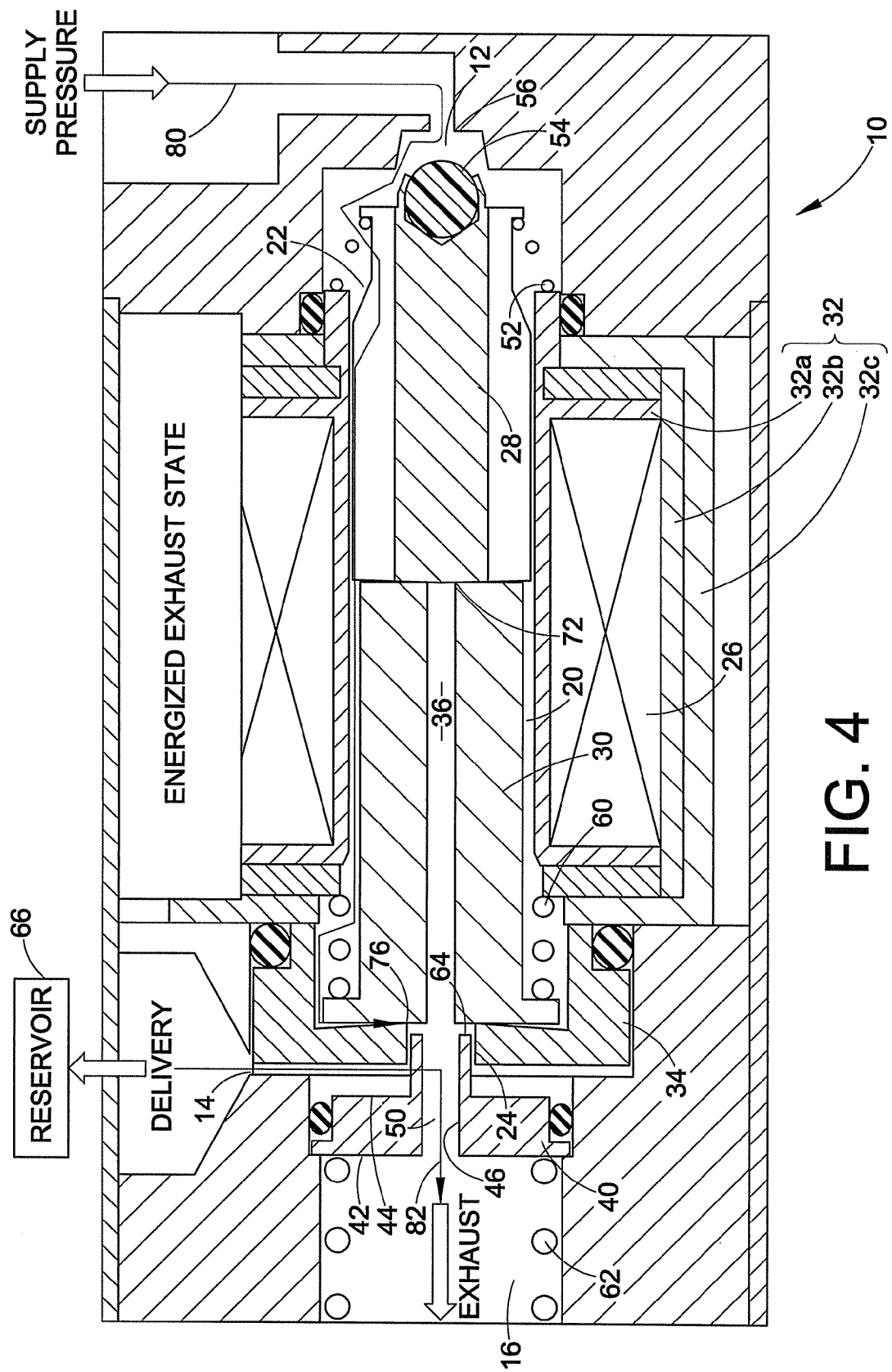
FIG. 4 illustrates a schematic representation of the solenoid valve in an energized exhaust state in accordance with one embodiment of an apparatus illustrating principles of the present invention.

With reference to FIG. 4, the solenoid valve 10 is illustrated in an energized exhaust state. In one embodiment, the energized exhaust state occurs after the energized state at lapped position (see FIG. 3). In the energized exhaust state, excess pressure in the delivery reservoir 66 (e.g., pressure in the delivery reservoir 66 above the target pressure range) acts on the bottom face 44 of the piston 40 to move the piston 40 further against the bias of the piston spring 62. Pressure on the bottom face 44 moves the piston 40 farther away from the endcap portion 34 of the bore housing 32, 34 and toward the exhaust port 16.

Once the bottom face 44 of the piston is moved farther away from the bore housing 32, 34, the seal between the piston stem 46 and the pole piece 30 at the piston seat 64 is broken. At this point, compressed air in the delivery reservoir 66 is fluidly transmitted to the exhaust port 16, as illustrated by the line 82. Pressure in the delivery reservoir 66 decreases as the compressed air is exhausted through the exhaust port 16 via the piston channel 50. As pressure in the delivery reservoir 66 decreases, pressure pushing against the bottom face 44 of the piston 40 decreases. Decreased pressure against the bottom face 44 of the piston 40 permits the bias of the piston spring 62 to move the piston 40 back toward the pole piece 30. Once the pressure in the delivery reservoir 66 drops to within the target pressure range, the piston spring 62 pushes the piston 40 far enough so that the stem portion 46 seals against the pole piece 30 at the piston seat 64—at which point, the solenoid valve 10 returns to the energized state at lapped position illustrated in FIG. 3.

Upon reaching equilibrium in the delivery reservoir 66, the solenoid valve 10 remains in the energized state at lapped position illustrated in FIG. 3 while the pressure in the delivery reservoir 66 remains in the target pressure range (i.e., between the cut-in pressure and the cut-out pressure). If the pressure in the delivery reservoir 66 drops below the cut-in pressure, the solenoid valve 10 returns to the initially energized state (see FIG. 2) before reaching equilibrium again (see FIG. 3) as discussed above. On the other hand, if the pressure in the delivery reservoir 66 exceeds the cut-out pressure, the solenoid valve 10 returns to the energized exhaust state (see FIG. 4) before reaching equilibrium again (see FIG. 3) as discussed above.

If the coil is de-energized, the solenoid valve 10 returns to the de-energized state (see FIG. 1).

Figure 5:
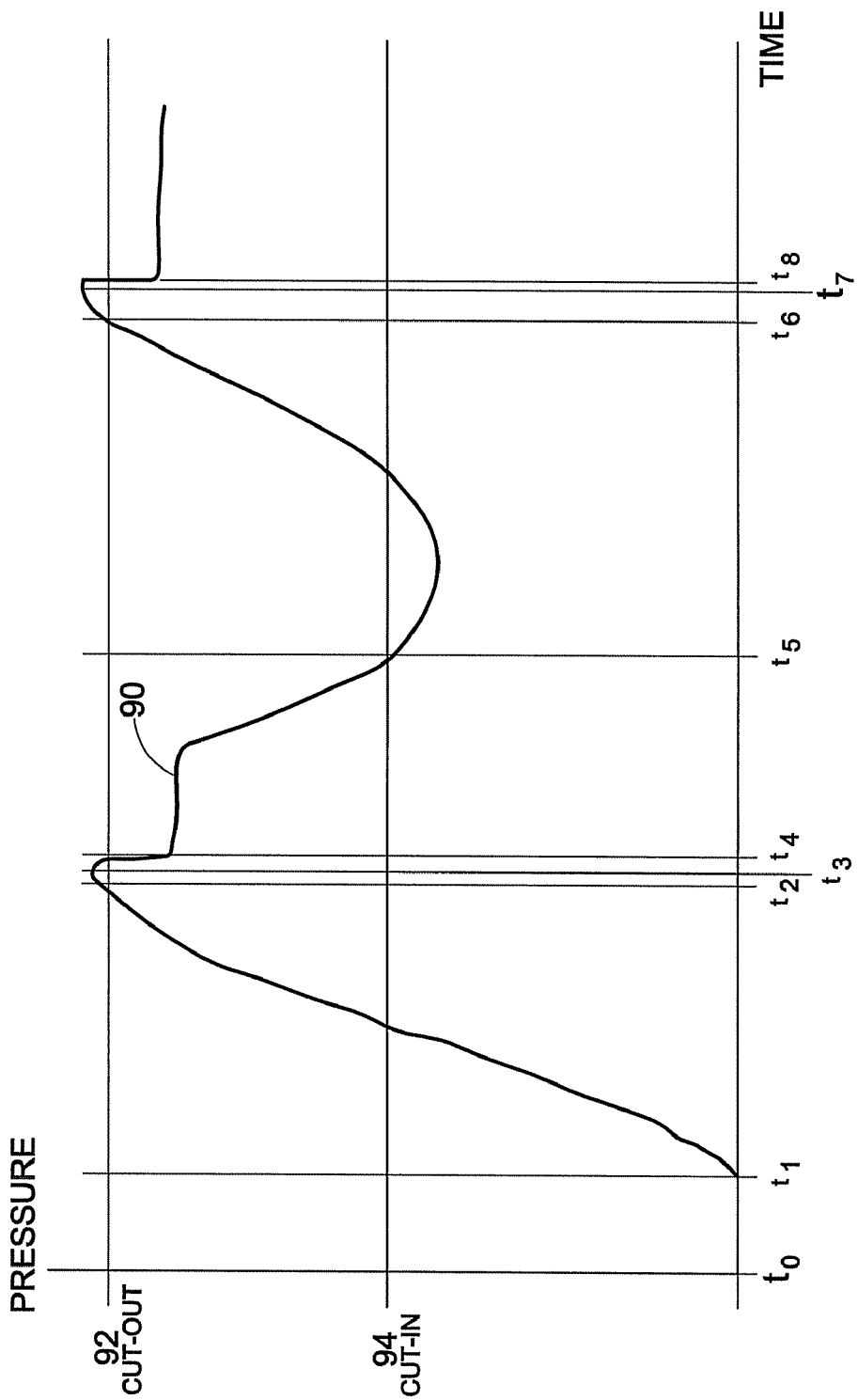
FIG. 5 illustrates a graph of pressure in a delivery reservoir as a function of time.

With reference to FIG. 5, a graph 90 illustrates the pressure in the delivery reservoir 66 (see FIGS. 1-4) as a function of time. Between times $t_0$ and $t_1$, the coil 26 (see FIGS. 1-4) is not energized and the solenoid valve 10 is in the de-energized state. Therefore, the pressure in the delivery reservoir 66 (see FIGS. 1-4) is zero (0). Between times $t_1$ and $t_2$, the coil 26 (see FIGS. 1-4) is energized and the solenoid valve 10 is in the initially energized state. Therefore, the pressure in the delivery reservoir 66 (see FIGS. 1-4) rises until the cut-out pressure 92 is reached.

Due to a time delay in the solenoid valve 10 transitioning to the energized state at lapped position, the pressure in the delivery reservoir 66 (see FIGS. 14) overshoots the cut-out pressure 92. The solenoid valve 10 remains in the energized state at lapped position between times $t_2$ and $t_3$. Then, between the times $t_3$ and $t_4$, the solenoid valve 10 is in the energized exhaust state during which the pressure in the delivery reservoir 66 (see FIGS. 1-4) decreases until the pressure is between the cut-in pressure 94 and the cut-out pressure 92. The solenoid valve 10 returns to the energized state at lapped position between times $t_4$ and $t_5$.

The pressure in the delivery reservoir 66 (see FIGS. 1-4) decreases between the times $t_4$ and $t_5$ due to, for example, a system demanding compressed air. Once the pressure in the delivery reservoir 66 (see FIGS. 1-4) decreases to below the cut-in pressure 94, the solenoid valve 10 returns to the initially energized state between the times $t_5$ and $t_6$, transitions to the energized state at lapped position at the time $t_6$, and transitions to the energized exhaust state at time $t_7$ before returning again to the energized state at lapped position at the time $t_8$.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A solenoid valve, comprising:
    a supply port fluidly communicating with a source of compressed air;
    a delivery port;
    a bore selectively fluidly communicating with the supply and delivery ports;
    an armature in the bore;
    a pole piece in the bore; and
    a coil, which is selectively energized with electrical power causing the armature to be magnetically attracted to the pole piece, around the armature and pole piece, the armature and pole piece selectively sealingly engaging and moving as an armature/pole piece single unit as a function of the electrical power in the coil, a position of the armature/pole piece within the bore controlling fluid communication between the supply port and the delivery port.

2. The solenoid valve as set forth in claim 1, wherein:
    the pole piece includes a passage that fluidly communicates with an exhaust port; and
    the delivery port fluidly communicates with the exhaust port via the passage in the pole piece when the pole piece is not sealingly engaging the armature.

3. The solenoid valve as set forth in claim 2, wherein:
    the pole piece does not sealingly engage the armature when no electrical power is in the coil.

4. The solenoid valve as set forth in claim 1, further including:
    a piston fluidly communicating with an exhaust port;
    wherein the pole piece includes a passage that fluidly communicates with the exhaust port via the piston.

5. The solenoid valve as set forth in claim 1, further including:
    a piston fluidly communicating with the exhaust port and selectively sealingly engaging the pole piece;
    wherein the piston selectively sealingly engages the pole piece as a function of a pressure at the delivery port; and
    wherein the piston selectively sealingly engages the pole piece as a function of a position of the pole piece.

6. The solenoid valve as set forth in claim 5, wherein:
    a pressure at the delivery port above a target pressure range causes the piston to disengage from the pole piece for exhausting pressure from the delivery port; and
    the piston sealingly engages the pole piece once the pressure at the delivery port is within the target pressure range.

7. The solenoid valve as set forth in claim 6, wherein:
    the pressure at the delivery port above the target pressure range is exhausted from the delivery' port via a piston channel.

8. The solenoid valve as set forth in claim 1, further including;
    an armature spring biasing the armature away from the pole piece;
    a pole spring biasing, the pole piece away from the armature;
    a piston fluidly communicating with the exhaust port and selectively sealingly engaging the pole piece; and
    a piston spring biasing the piston toward the pole piece.

9. The solenoid valve as set forth in claim 8, wherein when the coil is not energized:
    the armature spring biases the armature to sealitudy engage the supply port;
    the pole spring and the piston spring bias the pole piece and the piston to sealingly engage each other; and
    the delivery port fluidly communicates with an exhaust port via a passage in the pole piece and a channel in the piston.

10. The solenoid valve as set forth in claim 9, wherein when the coil is energized:
    the armature overcomes the bias of the armature spring to unseal the supply port and to sealingly engage the passage of the pole piece to form the armature/pole piece;
    the armature/pole piece sealingly engages the piston while the piston spring biases the piston and the armature/pole piece so that the supply port fluidly communicates with the delivery port when a pressure at the delivery port is below a target pressure range;
    if the pressure at the delivery port is within the target pressure range, the pressure at the delivery port moves the piston against the bias of the piston spring so that the armaturelpole piece sealingly engages a bore housing to prevent fluid communication between the supply port and the delivery port; and
    if the pressure at the delivery port is above the target pressure range, the pressure at the delivery port moves the piston against the bias of the piston spring so that the armature/pole piece sealingly engages the bore housing to prevent fluid communication between the supply port and the delivery port while the piston is disengaged from the pole piece for exhausting the delivery port to the exhaust port.

11. A system for controlling flow of compressed fluid, the system comprising:
   a supply port fluidly communicating with a source of compressed air;
   a delivery port fluidly communicating with a delivery reservoir;
   means for controlling a pressure in the delivery reservoir;
   a bore selectively fluidly communicating with the supply and delivery ports;
   an armature in the bore;
   a pole piece in the bore; and
   a coil, which is selectively energized with electrical power as a function of the pressure in the delivery reservoir, around the armature and pole piece, the armature and pole piece selectively sealingly engaging and moving as an armature/pole piece single unit as a function of the electrical power in the coil, a position of the armature/pole piece within the bore controlling fluid communication between the supply port and the delivery port;
   the means for controlling including:
      an armature spring biased to sealinol enuaue the armature with the supply port; and
      a pole spring and a piston spring biasing the pole piece and the piston toward each other, respective tensions in the armature spring, the pole spring, and the piston spring along with respective diameters of the supply port and the delivery port controlling the pressure in the delivery reservoir.

12. The solenoid valve as set forth in claim 11, wherein the means for controlling includes:
   a sensor measuring pressure in the reservoir.

13. The solenoid valve as set forth in claim 12, wherein:
   the sensor transmits a sinal to an electronic control unit that causes the coil to be energized with electrical power when a target pressure range is desired in the delivery reservoir.

14. The solenoid valve as set forth in claim 11, wherein when the coil is not energized:
   the armature spring biases the armature to seatingly engage the supply port;
   the pole spring and the piston spring bias the pole piece and the piston toward sealing engagement with each other; and
   the delivery reservoir fluidly communicates with an exhaust port via a passage in the pole piece and a channel in the piston.

15. The solenoid valve as set forth in claim 14, wherein when the coil is energized:
   the armature overcomes the bias of the armature spring to unseal the supply port and to sealingly engage the passage of the pole piece to form the armature/pole piece;
   the armature/pole piece sealingly engages the piston while the piston spring biases the piston and the armature/pole piece so that the supply port fluidly communicates with the delivery port when a pressure in the delivery reservoir is below the target pressure range;
   if the pressure in the delivery reservoir is within the target pressure range, the pressure at the delivery port moves the piston against the bias of the piston spring so that the armature/pole piece sealingly engages a bore housing to prevent fluid communication between the supply port and the delivery port; and
   if the pressure in the delivery reservoir is above the target pressure range, the pressure at the delivery port moves the piston against the bias of the piston spring so that the armature/pole piece sealingly engages the bore housing to prevent fluid communication between the supply port and the delivery port while the piston is disengaged from the pole piece for exhausting the delivery reservoir to the exhaust port.

16. A solenoid valve, comprising:
   a supply port fluidly communicating with a source of compressed air;
   a delivery port;
   a bore selectively fluidly communicating with the supply and delivery ports;
   an armature in the bore;
   a pole piece in the bore, the pole piece sealingly cooperating with the armature when a target pressure range is desired at the delivery port;
   a coil around the armature and pole piece, the pole piece not sealingly engaging the armature when no electrical power is in the coil; and
   means for controlling the sealing cooperation between the armature and the pole piece and a state of delivering pressure to the delivery port.

17. The solenoid valve as set forth in claim 16, wherein the means for controlling includes:
   the coil which is selectively energized with electrical power for sealingly engaging the armature and the pole piece.

18. The solenoid valve as set forth in claim 17, wherein the means for controlling further includes:
   a piston fluidly communicating with an exhaust port and selectively sealingly engaging the pole piece;
   a piston spring biasing the piston toward the pole piece; and
   a pole spring biasing the pole piece toward the piston;
   wherein the piston selectively sealingly engages the pole piece as a function of a pressure at the delivery port and respective tensions of the piston spring and the pole spring.

19. The solenoid valve as set forth in claim 18, wherein:
   a pressure at the delivery port above the target pressure range causes the piston to disengage from the pole piece for exhausting pressure from the delivery port; and
   the piston sealingly engages the pole piece once the pressure at the delivery port is within the target pressure range.

20. The solenoid valve as set forth in claim 16, wherein:
   the pole piece includes a passage that fluidly communicates with an exhaust port; and
   the delivery port fluidly communicates with the exhaust port via the passage in the pole piece when the pole piece is not sealingly engaging the armature.

21. A solenoid valve, comprising:
   a supply port fluidly communicating with a source of compressed air;
   a delivery port;
   an exhaust port fluidly communicating with atmosphere and selectively fluidly communicating with the delivery port;
   a bore selectively fluidly communicating with the supply, delivery, and exhaust ports;
   an armature in the bore;
   a pole piece in the bore;
   a coil, which is selectively energized with electrical power, around the armature and pole piece, the armature and pole piece selectively sealingly engaging and moving as an armature/pole piece single unit as a function of the electrical power in the coil, a position of the armature/pole piece within the bore controlling fluid communication between the supply, delivery, and exhaust ports; and a piston fluidly communicating with the exhaust port and selectively sealingly engaging the pole piece.

22. The solenoid valve as set forth in claim 21, wherein:
the piston selectively sealingly engages the pole piece as a function of a pressure at the delivery port; and
the piston selectively sealingly engages the pole piece as a function of a position of the pole piece.

23. The solenoid valve as set forth in claim 22, wherein when the coil is not energized:
the armature sealingly engages the supply port;
the pole piece and the piston sealingly engage each other; and
the delivery port fluidly communicates with the exhaust port.

24. The solenoid valve as set forth in claim 23, wherein when the coil is not energized:
the delivery port fluidly communicates with the exhaust port via a passage in the pole piece and a channel in the piston.

25. The solenoid valve as set forth in claim 23, wherein when the coil is energized:
the armature is positioned to unseal the supply port and to sealingly engage the pole piece to form the armature/pole piece;
the armature/pole piece sealingly engages the piston while the supply port fluidly communicates with the delivery port when a pressure at the delivery port is below a target pressure range;
if the pressure at the delivery port is within the target range, the pressure at the delivery port moves the piston so that the armature/pole piece sealingly engages a bore housing to prevent fluid communication between the supply port and the delivery port; and
if the pressure at the delivery port is above the target range, the pressure at the delivery port moves the piston so that the armature/pole piece sealing engages the bore housing to prevent fluid communication between the supply port and the delivery port while the piston is disengaged from the pole piece for exhausting the delivery port to the exhaust port.

26. The solenoid valve as set forth in claim 21, wherein:
the pole piece includes a passage that fluidly communicates with an exhaust port.

27. A solenoid valve, comprising:
a supply port fluidly communicating with a source of compressed air;
a delivery port;
a bore selectively fluidly communicating with the supply and delivery ports;
an armature in the bore;
a pole piece in the bore;
a coil, which is selectively energized with electrical power, around the armature and pole piece, the armature and pole piece selectively sealingly engaging and moving as a armature/pole piece single unit as a function of the electrical power in the coil, a position of the armature/pole piece within the bore controlling fluid communication between the supply port and the delivery port;
a coil housing around the coil;
an endcap sealingly engaging the coil housing, the armature and pole piece moving within the coil housing;
a piston fluidly communicating with the exhaust port and extending through the endcap to selectively sealingly engage the pole piece;
an armature spring biasing the armature away from the pole piece;
a pole spring biasing, the pole piece away from the armature; and
a piston spring biasing the piston toward the pole piece.

28. The solenoid valve as set forth in claim 27, wherein when the coil is energized:
the armature overcomes the bias of the armature spring to unseal the supply port and to sealingly engage the passage of the pole piece to form the single unit;
the armature/pole piece sealingly engages the piston while the piston spring biases the piston and the armature/pole piece so that the supply port fluidly communicates with the delivery port when a pressure in the delivery reservoir is below a target pressure range;
if the pressure in the delivery reservoir is within the target pressure range, the pressure at the delivery port moves the piston against the bias of the piston spring so that the armature/pole piece sealingly engages a bore housing to prevent fluid communication between the supply port and the delivery port; and
if the pressure in the delivery reservoir is above the target pressure range, the pressure at the delivery port moves the piston against the bias of the piston spring so that the armature/pole piece sealingly engages the bore housing to prevent fluid communication between the supply port and the delivery port while the piston is disengaged from the pole piece for exhausting the delivery reservoir to the exhaust port.

* * * * *